United States Patent [19]

Pak

[11] Patent Number: 4,565,374

[45] Date of Patent: Jan. 21, 1986

[54] MATHEMATICAL BOARD GAME APPARATUS

[76] Inventor: Kyong H. Pak, 2802 Garden Lakes Blvd., Rome, Ga. 30161

[21] Appl. No.: 512,602

[22] Filed: Jul. 11, 1983

[51] Int. Cl.⁴ .............................................. A63F 3/00
[52] U.S. Cl. .................................................... 273/272
[58] Field of Search ................................. 273/272, 299

[56] References Cited

U.S. PATENT DOCUMENTS

| | | | |
|---|---|---|---|
| 2,320,832 | 6/1943 | Schoenberg | 273/272 X |
| 3,224,114 | 12/1965 | Swanson . | |
| 3,267,590 | 8/1966 | Browning | 273/272 |
| 3,342,493 | 9/1967 | Lang . | |
| 3,744,153 | 7/1973 | Vanes . | |
| 3,904,204 | 9/1975 | Gold | 273/272 |
| 4,243,225 | 1/1981 | Levinrad | 273/272 |
| 4,283,058 | 8/1981 | De Cadier | 273/236 |
| 4,316,612 | 2/1982 | Harder | 273/272 |

Primary Examiner—Harland S. Skogquist
Attorney, Agent, or Firm—Jones & Askew

[57] ABSTRACT

A mathematical board game including a game board (21) bearing a rectangular grid (25) defining a plurality of ranks (R) and files (F). A plurality of tiles are provided for each player, each tile being marked with one of the base 11 digits [1, 2, 3 . . . 10] for placing on the board. Each player places one tile at a time in an attempt to provide rank, file, or diagonally contiguous sequences which sum to a number even divisible by ten. A combinatorial sieve to generate all non-redundant combinations of three integers which sum to either ten or twenty is used to derive the number of tiles marked with each digit (35).

1 Claim, 3 Drawing Figures

MATHEMATICAL BOARD GAME APPARATUS

TECHNICAL FIELD

The present invention relates to board games and in particular discloses a mathematical game wherein the scoring is provided by a particular player successfully placing a plurality of tile pieces bearing numerical indicia on contiguous playing positions so that the sum of the numerical indicia equals a number equally divisible by a predetermined integer.

BACKGROUND OF THE INVENTION

Challenging board games which require mathematical and verbal skill have been popular in the United States and other countries for many years. It is generally the purpose of these games, as with the present invention, to provide a challenge to the player which will test either mathematical or verbal skills, as well as strategic skills wherein blocking and sequencing tactics are used.

One of the more popular games in the United States has been sold under the trade name of Scrabble and includes a board defining a rectangular matrix of playing positions and a plurality of tile pieces, each marked with an individual letter. The players score points by sequencing the tile pieces, contiguous by rank or file, so that words to be found in a standard dictionary are formed.

A number of mathematical board games which have educational as well as entertainment value have been known in the past. For example, U.S. Pat. No. 3,224,114 discloses a mathematical game wherein the ranks and files of the board are each marked with a number and an overlay of the board includes a sign indicative of an arithmetic operation. Part of the object of the game is to place a tile bearing an indicium of the appropriate answer in the appropriate position on the board so that the number on the playing piece represents the result of the operator working on the rank number and the file number.

U.S. Pat. No. 3,342,493 shows a game of similar construction where ranks and files are numbered and tokens bearing indicia representative of mathematic operations of the rank and file numbers are placed on the board.

U.S. Pat No. 3,744,153 to Van Es shows another mathematical board game wherein the ranks and files of the playing surface are divided by a grid wherein elements of the grid dividing the ranks and files each bear a symbol indicative of a mathematical operation. A plurality of game pieces inscribed with particular digits and additional signs for mathematical operations are provided.

More recently, U.S. Pat No. 4,283,058 to de Cadier discloses a board game having an irregular matrix of playing positions and a number of tile pieces bearing numerical indicia. An object of the game is to provide, along the irregular path defined by the matrix, sequences of numerically contiguous integers.

Additionally, board game apparatus including both verbal and numerical playing pieces has been shown in U.S. Pat No. 4,243,225 to Levinrad.

While the prior art board games provide entertainment and education for the players, the prior art does not disclose a board game wherein a challenge of strategy is presented to the players such that players are presented with a choice at each turn whether to attempt to continue a sequence begun by the player, or to spend a turn in blocking a growing sequence of the opponent. Furthermore, there is need in the art for a mathematical board game with simple straightforward rules which require that the players think in terms of both board game strategy and summations of numbers.

SUMMARY OF THE PRESENT INVENTION

The present invention provides a unique mathematical board game apparatus including a game board with a conventional rectangular grid and a plurality of tile pieces having indicia inscribed thereon, chosen through a combinatorial device described hereinbelow, to maximize the number of possible plays in a given game.

The rules of the game are selected so that the players are constantly presented with a strategic choice whether to attempt to continue completing a sequence a particular player has been working toward in order to achieve a scoring play or to block a sequence being constructed by an opponent in order to prevent the opponent from scoring.

Thus, it is an object of the present invention to provide a novel and entertaining mathematical board game requiring both strategic skill and the ability to add sequences of numbers in order to calculate strategy.

Furthermore, it is an object of the present invention to present a player with tactical situations in which an appreciation of the probability of drawing a particular digit must be appreciated, in view of the number of tiles bearing such particular digit already played.

It is a further object of the present invention to provide a mathematical board game wherein scoring is provided by a particular player placing a sequence of tiles bearing numerical indicia in contiguous rank, file, or diagonal order on a game board, wherein the sum of the digits inscribed on each tile must equal a number evenly divisible by a predetermined integer, preferably 10.

It is a further object of the present invention to provide a method of playing a mathematical board game wherein players are each provided with a predetermined number of tile pieces, each bearing a base 11 digit and the players alternately place one tile at a time on the grid of a game board, replace the tile from a pool of unused tiles, and attempt to form contiguous sequences of numbers, the sum of which is divisible by a predetermined integer.

These and other objects of the present invention will become apparent from the detailed description below.

DETAILED DESCRIPTION

Figure 1:
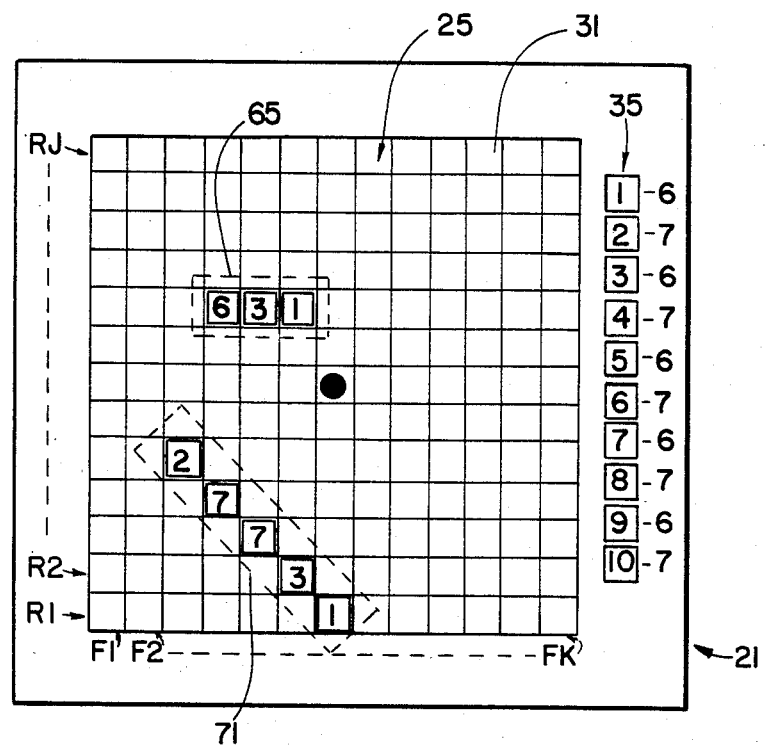
FIG. 1 is a plan view of the preferred embodiment of the board used in the present invention.

Turning first the drawing figures, the preferred embodiment of the present invention will now be described. FIG. 1 shows the preferred embodiment of the game board of the present invention. It may be seen from FIG. 1 that the game board 21 includes a rectangular grid, shown as 25, defining a plurality of ranks R1, R2, ... RJ and a plurality of files F1, F2 ... FK. As may be seen from FIG. 1, in the preferred embodiment, the rectangular grid is square and J=K=13. However, from the description below it will be apparent that a square matrix is not required to play the present game.

Furthermore, from the preferred form of selection of the indicia on the tiles, as described hereinbelow, it will be apparent that the selection of J and K equal to integers greater than 11 is strongly preferred so that there will be enough playing positions to accept all the playing tiles provided in the preferred embodiment.

Rectangular grid 25 defines a plurality of playing positions, an exemplary playing position being shown as 31, each defined by unique combination of rank and file number. In the example shown in FIG. 1, exemplary playing position 31 is at rank 13, file 11.

It is preferred, but not necessary, to provide the players with an indication of the number of tiles bearing each numerical indicium, as shown at 35 in FIG. 1. The significance of the number of tiles so chosen is described hereinbelow.

Figure 2:
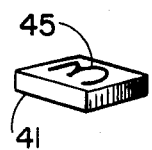
FIG. 2 is a pictorial view of an exemplary playing tile of the present invention.

Turning next to FIG. 2, an exemplary tile 41 is shown. It should be understood that the preferred embodiment of the present invention provides 130 such tiles, each of which bears a single base 11 digit, 1 through 10. On exemplary tile 41, the indicium 3 is indicated at 45.

Tiles 41 of the present invention may be made of any suitable substance, preferably wood or plastic, upon which indicia may be provided, either by placement of another substance on the substrate of the tile, or by embossing, engraving or the like; and for which the indicia are not visible when the tile is turned face down.

The indicia used in the present game apparatus are described as being in base 11 because the decimal number "10" is treated as a single digit. Thus, the number system used defines not only decimal digits 1 through 9 but a single digit 10 which will also be recognized as the equivalent of the hexadecimal digit A. This is provided, as explained hereinbelow, because the preferred embodiment of the present invention is one in which players must place contiguous sequences of tiles 41 on the playing board so that their sum is equal to a number evenly divisible by 10.

It will thus be appreciated that broadly stated, the present invention includes game apparatus wherein a plurality of tiles are provided, each of the plurality of tiles bearing a base L digit wherein an object of the game is to provide one of a set of possible combinations of digits on contiguous positions on the board, the sum of the digits being evenly divisible by $L-1$.

Figure 3:
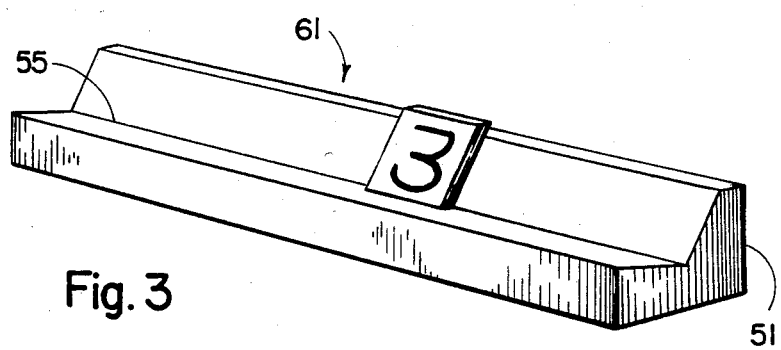
FIG. 3 is a pictorial view of the preferred embodiment of a tile holding rack used with the present invention.

FIG. 3 shows a preferred embodiment for a tile rack 51 used with the present invention having a trough shown at 55 for holding the tiles upright so the player may view them. A raised back section 61 prevents the opponents from observing indicia on the players tiles. Tile racks similar to rack 51 shown on FIG. 3 are known in the art and are not novel per se.

The game is played in the following manner. Each player selects five initial tiles 41 and places them in his or her rack 51. The player who is to go first may be chosen by any conventional arrangement of chance such as flipping a coin, or selecting one tile wherein the player with the highest digit inscribed on the selected tile makes the first play. The first player places a tile at any playing position on the board. The second player likewise may place a tile at any playing position.

During any subsequent turn, any player may place a tile in any position on the board he or she desires, irrespective of whether it is contiguous to a tile already placed in a playing position. As will become apparent from the description to follow, it is necessary in playing the game of the present invention to be able to determine which player placed which tiles on the board. There, it is preferable to provide two distinct sets of tiles which may be readily distinguished, such as by color.

The players score points by successfully placing m tiles on the board, m=[3,5], the sum of which equals N, with N being evenly divisible by 10. The notation m=[3,5] indicates that m may take one of only two possible values, 3 or 5. Thus, a particular player can only score by placing 3 or 5 tiles at contiguous locations, wherein the sum of the indicia on the tiles is a number evenly divisible by 10.

As used in this specification, the concept of a contiguous sequence of tiles means that the sequence of tiles are located in either rank, file, or diagonally contiguous playing positions. Thus, as shown in FIG. 1, the sequence indicated within dashed line 65 is rank contiguous and the sequence shown within dashed line 71 is diagonally contiguous.

Sequence 65 shows an example where m=3 and the sum of the digits equals 10. Assuming that all the tiles within sequence 65 are those of a single player, the player would be awarded a score of 10 upon completion of sequence 65.

Assuming that all the tiles of sequence 71 are those of a single player, a score of 20 is awarded for that sequence, where m=5. Note that no score was possible during formation of sequence 71 since no three contiguous tiles within the sequence equal the number 10.

Furthermore, while scoring is limited to sequences having sums equally divisible by 10, no points are awarded for 1, 2, 4 or more than 5 tiles. Thus, achieving the 7, 3 subsequence shown within sequence 71 awards the player no points.

Upon any player preparing to take his or her turn, the turn can be used to place a tile to block a sequence being formed by another player. However, no points may be scored by virtue of a sequence consisting of tiles of two different players irrespective of the sum. Thus, for example, if the 6 and 3 tiles shown within sequence 65 (rank 9, files 4 and 5) are the tiles of a first player, and the tile bearing indicium 1 (rank 9, file 6) is that of a second player, neither player scores as a result of sequence 65.

It will thus be appreciated that the players are presented with an option at each turn as to whether to block a sequence being created by their opponent or to continue a sequence of their own. If a player determines that his or her opponent needs a particular number to complete a sequence, the player can further ascertain that the majority of tiles of the opponent bearing the required digit have been used, the player might elect to continue working on his or her own sequence, rather than block the opponent since there is a relatively low probability that the opponent either possesses or will draw the number required to complete the opponent's sequence. These and other tactical decision which challenge the players will become apparent from playing the game described herein.

Since the base 11 digits are included in the digits defined by the indicia on the tiles, and only sequences of the 3 or 5 tiles may be used to score, it will be readily apparent that for any scoring sequence where m=3, scores of 10, 20 or 30 points are possible. Likewise, for sequences where m=5, the only possible scores are 10, 20, 30, 40 or 50 points.

A variation on the game is one in which a score of ten for a five tile sequence is illegal, and thus the only possible scores for a five tiles are 20, 30, 40, and 50.

In the preferred form of the game, the game is played to where one player achieves or exceeds a predetermined score, such as 200. This can be considered a set and the inventor has discovered that playing sets defined as 200 points, and playing an entire game as the best two out of three, or three out of five, sets normally provides a game of adequate but not excessive length which is entertaining to the players.

As noted above, the indicia shown as 35 in FIG. 1 indicate the number of tiles provided for each player in the preferred embodiment. The number of tiles was selected by construcing a matrix of integer sequences which, while having different operating rules, is conceptually similar to the sieve of Eratosthenes, in that a predetermined matrix of numbers is constructed, and depending on the relationship of the numbers to each other, certain ones are stricken out of the sieve in order to provide a useful set of remaining numbers. The sieve of Eratosthenes is designed to generate a sequence of prime numbers.

The arrangement used by the inventor of the present invention was designed to provide a complete set of combinations (irrespective of order) of three base 11 digits, the sum of which is equal to 10 or 20. The matrix is constructed by using a plurality of rows in the matrix wherein the first digit in each combination is a digit corresponding to the row number. Thus, all combinations in row 1 begin with a digit 1, all combinations in row 2 begin with a digit 2, etc. The second digit of each combination is provided sequentially, except when it is impossible to render a sum equal to 10 or 20 using such a digit. The third digit of each combination is the base 11 digit chosen so that the sum of all the digits in the combination equals 10 or 20.

As the above-described matrix is constructed, or after it is entirely constructed, the striking of redundant combinations is done by observing all the previous numbers which are left and striking digit sequences which have the same combination of digits as a previous unstruck sequence, wherein only the order is different. For example, applying the above-stated rules, the first row of the matrix begins 118. The next entry in row 1 is 127, following by 136, 145 and 154. Using the rule recited above, it will be apparent that 154 is the first combination to be struck since it is redundant of the combination 145.

Continuing across row 1, 163 is redundant of 136 and is thus struck. Similarly, 172 and 181 are struck. The last entry on row 1 is 19(10). The digit 10 is indicated as "(10)".

Anyone following the above-noted set of rules will find that the following matrix results.

In the sieve construction shown above, the number in the lefthand column shows the number of 3-digit combinations in each row which remain after the rule for striking is applied. It will further be appreciated that all of row 7 is struck. Applying the rule to continue creating rows having numbers 8, 9 and 10, shows that no more combinations will remain. Thus, as shown in the above matrix, there are 21 3-digit combinations, each of which have a distinct combination of base 11 digits which sum to either 10 or 20. Thus, 63 tiles may be used to construct a set of tiles bearing the digits of the combinations, thus assuring that all tiles may be used to construct sequences adding to 10 or 20.

To summarize the combinations developed by the foregoing mathematic sieve, it will be appreciated that the rule defines a plurality of distinct sets of base 11 digits, irrespective of order, $S_x$ according to the following rule:

$$S_x = \{n_1, n_2, n_3\} \text{ such that for } n = [1,2,3 \ldots 10]; \sum_{k=1}^{k=3} n_k = [10,20];$$

wherein the notation that the summation equals [10, 20] is again used to indicate that the two values within the brackets are the only allowable values for the sum.

Counting the occurrences of each digit within the combinations remaining in the foregoing sieve, it will be apparent that for digits 1 through 9, n tiles should be marked with each digit wherein n=6 for odd digits, and n=7 for even digits. From inspection of the foregoing sieve, it will further be appreciated that five occurrences of the digit (10) remain. Since the provision of additional tiles with the digit 10 will not disturb the integrity of providing sequences which sum to a number evenly divisible by 10, the inventor has selected an arbitrary number of additional tiles to be marked with the digit 10. In the preferred form, the arbitrary number is 2. Thus, the above-stated rule of providing 6 tiles per player having each odd number digit and 7 tiles per player bearing each even number base 11 digit can be extended, in the preferred embodiment, to the digit (10). Therefore, in the preferred embodiment of the present invention designed to be played by two players, or two pairs of players acting as partners, a total of 130 tiles are provided, 65 for each player. Each player's 65 tiles bear a single base 11 digit and the number of each digit provided each player is shown at 35 in FIG. 1 and may be derived from the sieve described hereinabove.

Furthermore, it will be appreciated that the present invention includes a method of playing a mathematical board game which includes the steps of providing the apparatus described above. Further steps of the method of the present invention include providing each of a first and second player with 5 tiles. Subsequently, each of the first and second players alternately place one of the

| No. | | | | | | | | | |
|---|---|---|---|---|---|---|---|---|---|
| 5 | 118 | 127 | 136 | 145 | 154 | 163 | 172 | 181 | 19(10) |
| 5 | 217 | 226 | 235 | 244 | 253 | 262 | 271 | 28(10) | 299 |
| 3 | 316 | 325 | 334 | 343 | 352 | 361 | 37(10) | 389 | 3(10)7 |
| 3 | 415 | 424 | 433 | 442 | 451 | 46(10) | 479 | 488 | 497 |
| 3 | 514 | 523 | 532 | 541 | 569 | 578 | 587 | 596 | 5(10)5 |
| 2 | 613 | 622 | 631 | 64(10) | 659 | 668 | 677 | 686 | 695 |
| 0 | 712 | 721 | 73(10) | 749 | 758 | 767 | 776 | 785 | 794 |
| 21 | | | | | | | | | | tile pieces 41 on one of the playing positions of the rectangular grid 25.

The next step of the method of the present invention is to provide each player with a score equal to N wherein:

$$N = \sum_{k=1}^{k=m} n_k, \; m = [3,5], \text{ and Remainder } (N/10) = 0;$$

$n_k$ being the value of indicia on each tile piece of a rank, file, or diagonally contiguous sequence to tile pieces placed on the game board by the scoring player. The players then repeat the above-recited steps of alternately placing a single tile on rectangular grid 25 and drawing a replacement tile for each turn. Play continues until a total of the scores as described above, exceeds a predetermined number.

From the foregoing description, it will be appreciated that the method and apparatus of the present invention provide an entertaining and challenging game wherein predetermined numbers, chosen according to the combination yielded by the mathematical sieve described above, provide predetermined numbers of tiles, each bearing a base L digit. An object of the game is to provide contiguous sequences of the tiles so that the sums of the indicias on the tiles in the sequences are evenly divisible by L−1. In view of the foregoing description of the preferred embodiment, other embodiments of the present invention will suggest themselves to those skilled in the art and thus the scope of the present invention is limited only by the claims below.

I claim:

1. A method of playing a mathematical board game by a first player and second player comprising the steps of:

(a) providing a game board including indicia thereon defining a rectangular matrix of playing positions, said rectangular matrix being characterized by J ranks and K files; J and K being positive integers greater than 11;

(b) providing a first plurality of tile pieces, each of said tile pieces being inscribed with a single digit n, n including integer values between and including 1 through 10 such that for n=[1, 2, 3 . . . 10] seven tile pieces of said plurality of tile pieces bear indicia n for n=an even integer, and six tile pieces of said plurality of tile pieces bear indicia n for n=an odd integer, and providing a second like plurality of said tile pieces;

(c) providing said first player with five tile pieces of said first plurality of tile pieces;

(d) providing said second player with five tile pieces of said second like plurality of tile pieces;

(e) said first player and said second player alternately placing one of said tile pieces on one of said playing positions of said rectangular matrix and drawing a replacement tile from the player's respective plurality of tiles;

(f) providing a score for each particular one of said first player and second player equal to N, wherein $$N = \sum_{k=1}^{k=m} n_k, \; m = [3,5], \text{ and Remainder } (N/10) = 0;$$

$n_k$ being the value of indicia on each tile piece of a rank, file or diagonally contiguous sequence of said tile pieces, all placed on said rectangular matrix of said game board by said particular one of said players during a plurality of repetitions of step (e); and (g) repeating steps (e) and (f) above until a total score for one of said first player or second player equals a predetermined number.

* * * * *